United States Patent
Rico Alvarino et al.

(10) Patent No.: US 11,362,779 B2
(45) Date of Patent: Jun. 14, 2022

(54) USING CELL-SPECIFIC REFERENCE SIGNALS FOR A MACHINE-TYPE COMMUNICATION PHYSICAL DOWNLINK CONTROL CHANNEL

(71) Applicant: QUALCOMM Incorporated, San Diego, CA (US)

(72) Inventors: Alberto Rico Alvarino, San Diego, CA (US); Vinod Ramaswamy, Hyderabad (IN); Gowrisankar Somichetty, Bangalore (IN); Wanshi Chen, San Diego, CA (US); Le Liu, Fremont, CA (US); Xiao Feng Wang, San Diego, CA (US); Ayan Sengupta, San Diego, CA (US); Tae Min Kim, San Diego, CA (US); Vijayvaradharaj Tirucherai Muralidharan, Bangalore (IN); Murali Menon, Acton, MA (US)

(73) Assignee: QUALCOMM Incorporated, San Diego, CA (US)

( * ) Notice: Subject to any disclaimer, the term of this patent is extended or adjusted under 35 U.S.C. 154(b) by 234 days.

(21) Appl. No.: 16/515,692

(22) Filed: Jul. 18, 2019

(65) Prior Publication Data

US 2020/0052842 A1 Feb. 13, 2020

(30) Foreign Application Priority Data

Aug. 7, 2018 (IN) .............................. 201841029650

(51) Int. Cl.
*H04L 5/00* (2006.01)
*H04W 72/04* (2009.01)
(Continued)

(52) U.S. Cl.
CPC ........ *H04L 5/0048* (2013.01); *H04J 11/0079* (2013.01); *H04L 25/0202* (2013.01); *H04W 72/042* (2013.01); *H04W 76/27* (2018.02)

(58) Field of Classification Search
None
See application file for complete search history.

(56) References Cited

U.S. PATENT DOCUMENTS

2014/0314041 A1 10/2014 Kim et al.
2015/0207601 A1* 7/2015 Kim ...................... H04L 5/005
370/329

(Continued)

OTHER PUBLICATIONS

Ericsson: "M-PDCCH link performance for MTC", 3GPP Draft; R1-155031 M-PDCCH Link Performance for MTC, 3rd Generation Partnership Project (3GPP), Mobile Competence Ceitire ; 650, Route Des Lucioles ; F-06921 Sophia-Antipolis Cedex; France, vol. RAN WG1, No. Malmo, Sweden; Oct. 5, 2015-Oct. 9, 2015, Sep. 26, 2015 (Sep. 26, 2015), XP051021399, 6 Pages, Retrieved from the Internet: URL:http://www.3gpp.org/ftp/tsg_ran/WG1_RL1/TSGR1_82b/Docs/ [retrieved on Sep. 26, 2015], Sections 2, 3.1 and 3.2.

(Continued)

*Primary Examiner* — Jutai Kao
(74) *Attorney, Agent, or Firm* — Qualcomm Incorporated

(57) ABSTRACT

Various aspects of the present disclosure generally relate to wireless communication. In some aspects, a user equipment may determine a relationship between a first set of antenna ports, used for demodulation reference signals (DMRS) associated with a machine-type communication physical downlink control channel (MPDCCH) and used for the MPDCCH, and a second set of antenna ports used for cell-specific reference signals (CRS); receive CRS on one or more antenna ports of the second set of antenna ports; and
(Continued)

receive the MPDCCH using at least the CRS based at least in part on the relationship. Numerous other aspects are provided.

59 Claims, 8 Drawing Sheets

(51) Int. Cl.
*H04L 25/02* (2006.01)
*H04J 11/00* (2006.01)
*H04W 76/27* (2018.01)

(56) References Cited

U.S. PATENT DOCUMENTS

| | | | |
|---|---|---|---|
| 2015/0215908 A1* | 7/2015 | Seo | H04L 5/0051 370/329 |
| 2017/0171842 A1* | 6/2017 | You | H04L 5/0023 |
| 2019/0173532 A1* | 6/2019 | Liu | H04B 7/024 |
| 2019/0260425 A1* | 8/2019 | Ji | H04L 5/0091 |
| 2019/0342058 A1* | 11/2019 | Kwak | H04L 5/0082 |
| 2021/0126677 A1* | 4/2021 | Park | H04L 5/0053 |

OTHER PUBLICATIONS

International Search Report and Written Opinion—PCT/US2019/042645—ISA/EPO—dated Oct. 8, 2019.

* cited by examiner

USING CELL-SPECIFIC REFERENCE SIGNALS FOR A MACHINE-TYPE COMMUNICATION PHYSICAL DOWNLINK CONTROL CHANNEL

CROSS-REFERENCE TO RELATED APPLICATIONS UNDER 35 U.S.C. § 119

This application claims priority to India Patent Application No. 201841029650, filed on Aug. 7, 2018, entitled "USING CELL-SPECIFIC REFERENCE SIGNALS FOR A MACHINE-TYPE COMMUNICATION PHYSICAL DOWNLINK CONTROL CHANNEL," which is hereby expressly incorporated by reference herein.

FIELD OF THE DISCLOSURE

Aspects of the present disclosure generally relate to wireless communication and to techniques and apparatuses for using cell-specific reference signals (CRS) for a machine-type communication physical downlink control channel (MPDCCH).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include determining a relationship between a first set of antenna ports, used for demodulation reference signals (DMRS) associated with a machine-type communication physical downlink control channel (MPDCCH) and used for the MPDCCH, and a second set of antenna ports used for cell-specific reference signals (CRS); receiving CRS on one or more antenna ports of the second set of antenna ports; and receiving the MPDCCH using at least the CRS based at least in part on the relationship.

In some aspects, a UE for wireless communication may include memory and one or more processors operatively coupled to the memory. The memory and the one or more processors may be configured to determine a relationship between a first set of antenna ports, used for DMRS associated with an MPDCCH and used for the MPDCCH, and a second set of antenna ports used for CRS; receive CRS on one or more antenna ports of the second set of antenna ports; and receive the MPDCCH using at least the CRS based at least in part on the relationship.

In some aspects, a non-transitory computer-readable medium may store one or more instructions for wireless communication. The one or more instructions, when executed by one or more processors of a UE, may cause the one or more processors to determine a relationship between a first set of antenna ports, used for DMRS associated with an MPDCCH and used for the MPDCCH, and a second set of antenna ports used for CRS; receive CRS on one or more antenna ports of the second set of antenna ports; and receive the MPDCCH using at least the CRS based at least in part on the relationship.

In some aspects, an apparatus for wireless communication may include means for determining a relationship between a first set of antenna ports, used for DMRS associated with an MPDCCH and used for the MPDCCH, and a second set of antenna ports used for CRS; means for receiving CRS on one or more antenna ports of the second set of antenna ports; and means for receiving the MPDCCH using at least the CRS based at least in part on the relationship.

In some aspects, a method of wireless communication, performed by a UE, may include receiving an indication that CRS and DMRS use the same set of physical antennas; performing channel estimation for one or more resource elements of a resource block using one or more DMRS; receiving one or more CRS in the resource block; estimating a relative precoder between the one or more DMRS and the one or more CRS; and performing channel estimation for an MPDCCH based at least in part on the one or more CRS and the relative precoder.

In some aspects, a UE for wireless communication may include memory and one or more processors operatively coupled to the memory. The memory and the one or more processors may be configured to receive an indication that CRS and DMRS use the same set of physical antennas; perform channel estimation for one or more resource elements of a resource block using one or more DMRS; receive one or more CRS in the resource block; estimate a relative precoder between the one or more DMRS and the one or more CRS; and perform channel estimation for an MPDCCH based at least in part on the one or more CRS and the relative precoder.

In some aspects, a non-transitory computer-readable medium may store one or more instructions for wireless communication. The one or more instructions, when executed by one or more processors of a UE, may cause the one or more processors to receive an indication that CRS and DMRS use the same set of physical antennas; perform channel estimation for one or more resource elements of a resource block using one or more DMRS; receive one or more CRS in the resource block; estimate a relative precoder between the one or more DMRS and the one or more CRS; and perform channel estimation for an MPDCCH based at least in part on the one or more CRS and the relative precoder In some aspects, an apparatus for wireless communication may include means for receiving an indication that CRS and DMRS use the same set of physical antennas; means for performing channel estimation for one or more resource elements of a resource block using one or more DMRS; means for receiving one or more CRS in the resource block; means for estimating a relative precoder between the one or more DMRS and the one or more CRS; and means for performing channel estimation for an MPDCCH based at least in part on the one or more CRS and the relative precoder.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
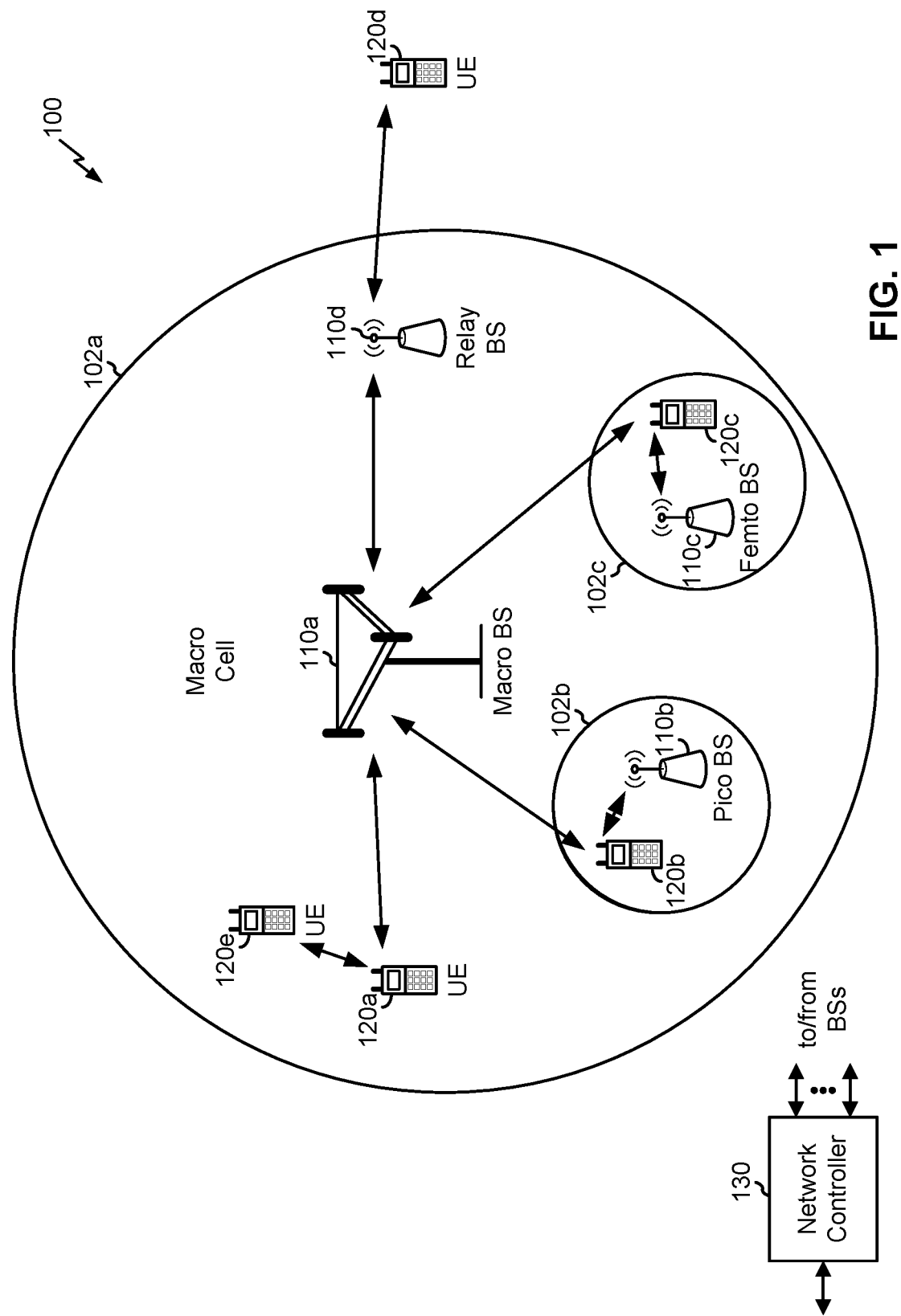
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of B Ss 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. ABS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
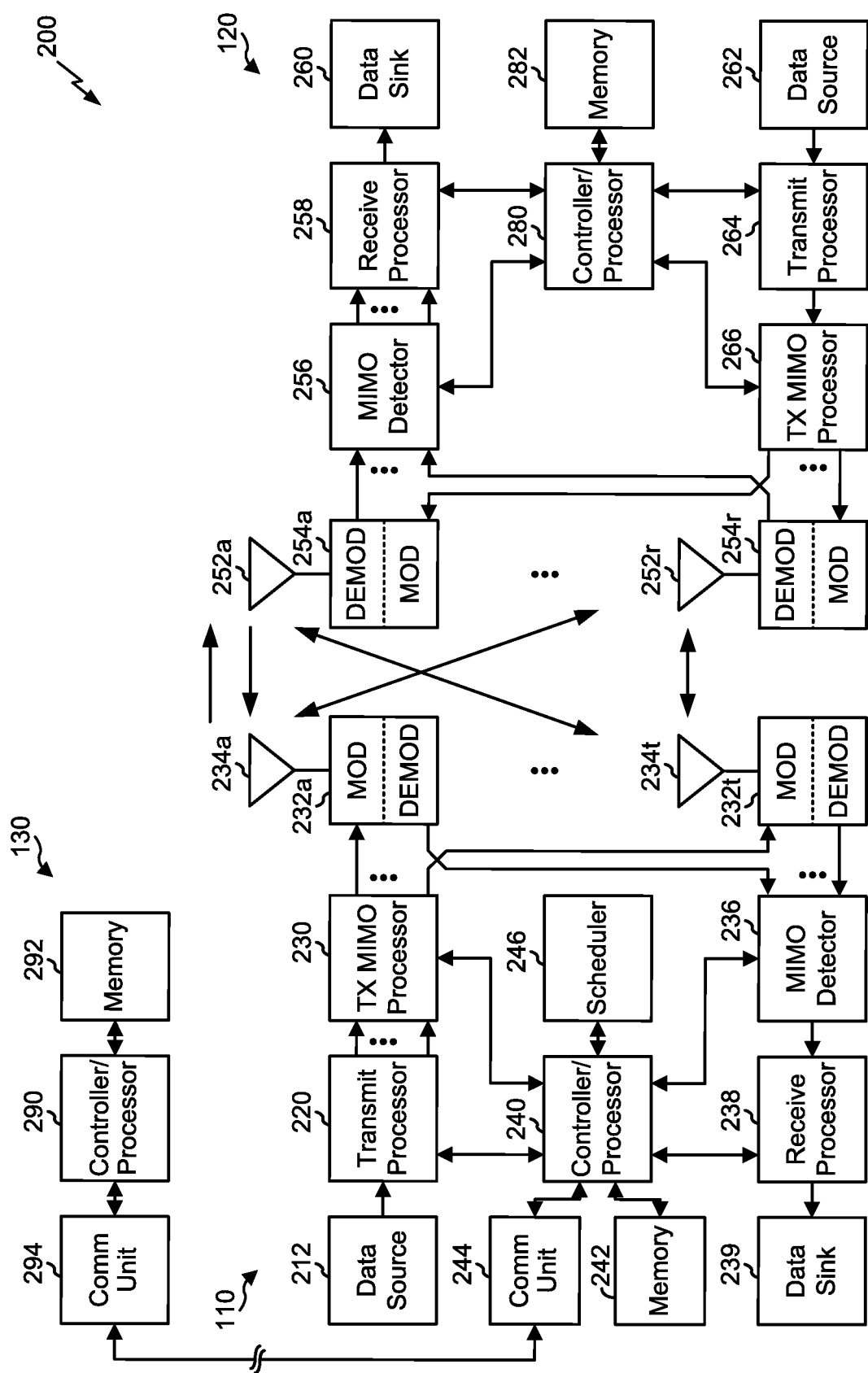
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with using cell-specific reference signals (CRS) for a machine-type communication physical downlink control channel (MPDCCH), as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for determining a relationship between a first set of antenna ports, used for demodulation reference signals (DMRS) associated with a machine-type communication physical downlink control channel (MPDCCH) and used for the MPDCCH, and a second set of antenna ports used for cell-specific reference signals (CRS); means for receiving CRS on one or more antenna ports of the second set of antenna ports; means for receiving the MPDCCH using at least the CRS based at least in part on the relationship; and/or the like. Additionally, or alternatively, UE 120 may include means for receiving an indication that CRS and DMRS use the same set of physical antennas; means for performing channel estimation for one or more resource elements of a resource block using one or more DMRS; means for receiving one or more CRS in the resource block; means for estimating a relative precoder between the one or more DMRS and the one or more CRS; means for performing channel estimation for an MPDCCH based at least in part on the one or more CRS and the relative precoder; and/or the like. In some aspects, such means may include one or more components of UE 120 described in connection with FIG. 2.

As indicated above, FIG. 2 is provided merely as an example. Other examples may differ from what is described with regard to FIG. 2.

Figure 3:
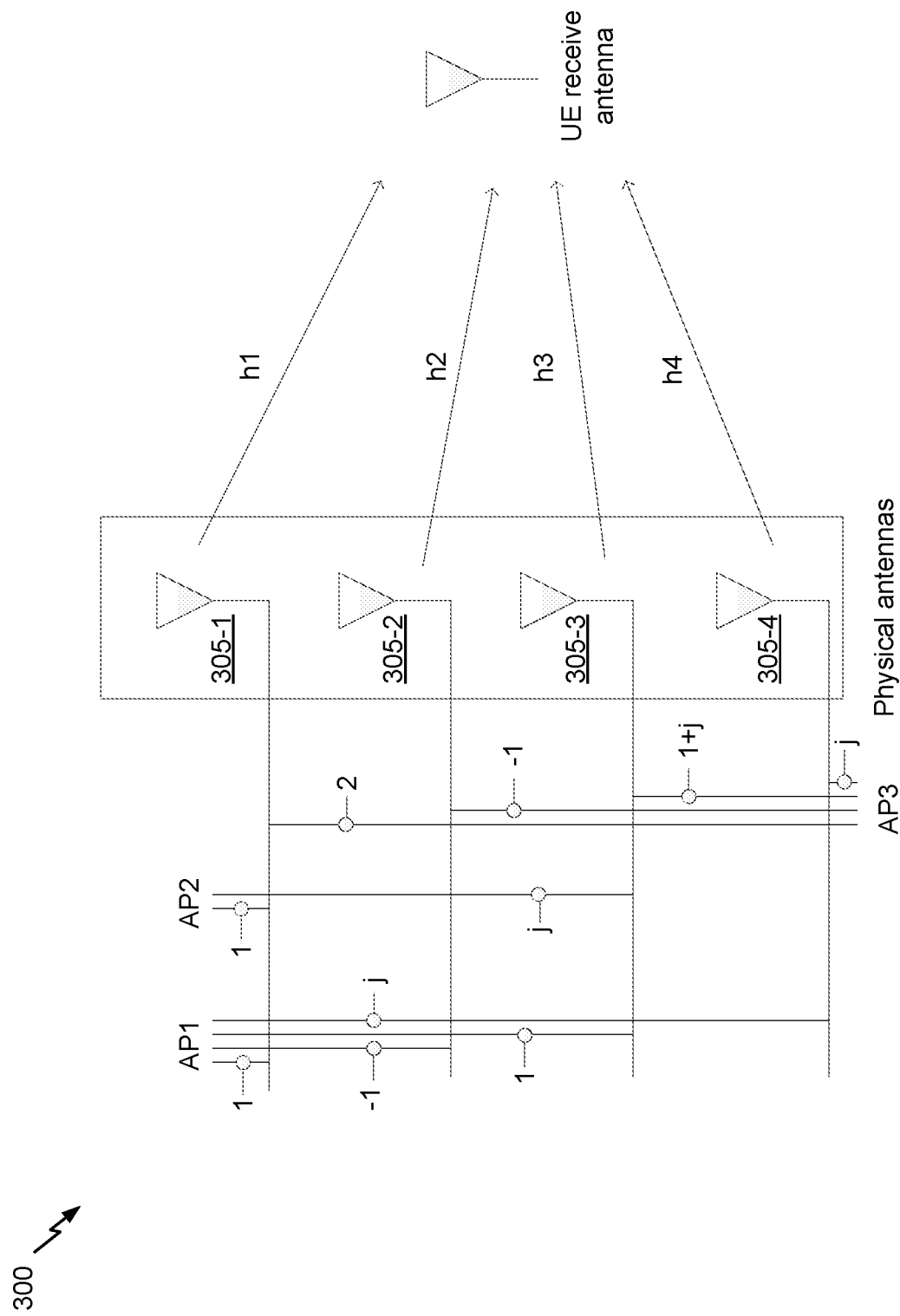
FIG. 3 is a diagram illustrating an example of antenna ports, in accordance with various aspects of the present disclosure.

FIG. 3 is a diagram illustrating an example 300 of antenna ports, in accordance with various aspects of the present disclosure.

As shown in FIG. 3, a first physical antenna 305-1 may transmit information via a first channel h1, a second physical antenna 305-2 may transmit information via a second channel h2, a third physical antenna 305-3 may transmit information via a third channel h3, and a fourth physical antenna 305-4 may transmit information via a fourth channel h4. Such information may be conveyed via a logical antenna port, which may represent some combination of the physical antennas and/or channels. In some cases, a UE 120 may not have knowledge of the channels associated with the physical antennas, and may only operate based on knowledge of the channels associated with antenna ports, as defined below.

An antenna port may be defined such that a channel, over which a symbol on the antenna port is conveyed, can be inferred from a channel over which another symbol on the same antenna port is conveyed. In example 300, a channel associated with antenna port 1 (AP1) is represented as h1−h2+h3+j*h4, where channel coefficients (e.g., 1, −1, 1, and j, in this case) represent weighting factors (e.g., indicating phase and/or gain) applied to each channel. Such weighting factors may be applied to the channels to improve signal power and/or signal quality at one or more receivers. Applying such weighting factors to channel transmissions may be referred to as precoding, and a precoder may refer to a specific set of weighting factors applied to a set of channels.

Similarly, a channel associated with antenna port 2 (AP2) is represented as h1+j*h3, and a channel associated with antenna port 3 (AP3) is represented as 2*h1−h2+(1+j)*h3+j*h4. In this case, antenna port 3 can be represented as the sum of antenna port 1 and antenna port 2 (e.g., AP3=AP1+AP2) because the sum of the expression representing antenna port 1 (h1−h2+h3+j*h4) and the expression representing antenna port 2 (h1+j*h3) equals the expression representing antenna port 3 (2*h1−h2+(1+j)*h3+j*h4). It can also be said that antenna port 3 is related to antenna ports 1 and 2 [AP1,AP2] via the precoder [1,1] because 1 times the expression representing antenna port 1 plus 1 times the expression representing antenna port 2 equals the expression representing antenna port 3. Additional details regarding antenna ports are described below.

As indicated above, FIG. 3 is provided merely as an example. Other examples may differ from what is described with regard to FIG. 3.

Figure 4:
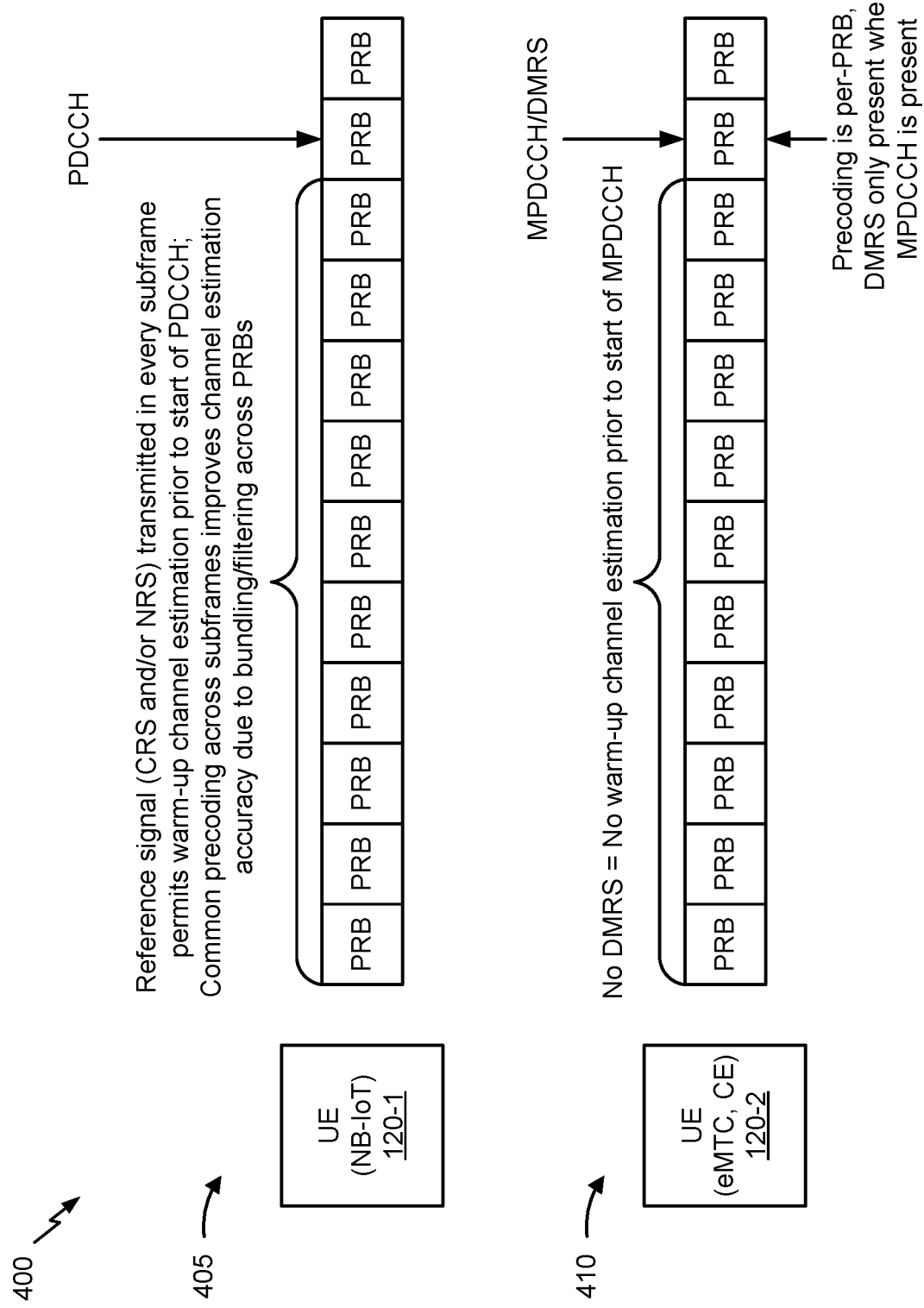
FIG. 4 is a diagram illustrating an example of a machine-type communication physical downlink control channel (MPDCCH), in accordance with various aspects of the present disclosure.

FIG. 4 is a diagram illustrating an example 400 of an MPDCCH, in accordance with various aspects of the present disclosure.

As shown by reference number 405, a first type of UE 120-1, such as an NB-IoT UE, may use a physical downlink control channel (PDCCH) to receive control information (e.g., downlink control information (DCI) and/or the like). The UE 120-1 may operate with a low signal to noise ratio (SNR), such as around −15 dB SNR. To improve communication performance at this low SNR, the UE 120-1 may perform cross-subframe channel estimation to receive the PDCCH (e.g., to estimate and/or demodulate the PDCCH). For example, the UE 120-1 may wake up prior to the start of the PDCCH, such as 5 to 10 subframes before the start of the PDCCH, and may obtain cell-specific reference signals (CRS) and/or narrowband cell-specific reference signals (NRS) in these subframes. The UE 120-1 may use the CRS and/or NRS to perform channel estimation for the PDCCH, so that the UE already has already processed a number of CRS and/or NRS samples to calculate a relatively accurate channel estimation by the time the PDCCH starts. This is possible because this type of communication system (e.g., that uses PDCCH for UEs, such as NB-IoT UEs and/or the like) may use the same precoder across a number of subframes, and so CRS or NRS samples received in one subframe can be used to perform channel estimation for another subframe. Additionally, CRS or NRS are guaranteed to be present a number of subframes before the start of the PDCCH (also known as warm-up subframes), due to a configuration of such a communication system.

As shown by reference number 410, a second type of UE 120-2, such as an eMTC UE or a UE in a coverage enhancement (CE) mode, may use a machine-type communication physical downlink control channel (MPDCCH) to receive control information. As described above, the UE 120-2 may operate with a low SNR. However, in this type of communication system (e.g., that uses an MPDCCH for UEs, such as eMTC UEs, UEs in a CE mode, and/or the like), the UE 120-2 may not be capable of performing cross-subframe channel estimation for the MPDCCH prior to the start of the MPDCCH because the reference signal used for demodulation (e.g., DMRS) may only be present in those subframes where the MPDCCH is present (i.e., there may not be any warm-up subframes for MPDCCH). Additionally, precoding for this type of communication system is per-PRB (e.g., where different precoders are used for different PRBs, or where the UE 120-2 cannot assume that the same precoder is used across PRBs and/or subframes). Thus, a different precoder may be used for a PRB and/or subframe in which the MPDCCH is conveyed, as compared to prior PRBs and/or subframes, thereby rendering prior channel estimates ineffective for receiving the MPDCCH (e.g., for estimating and/or demodulation the MPDCCH). As a result, performance may suffer due to a relatively inaccurate channel estimate for the MPDCCH.

Furthermore, the MPDCCH is DMRS-based, meaning that DMRS estimates are used to demodulate the MPDCCH. For example, the UE 120-2 may estimate a precoder used for DMRS, and may use the same precoder to receive the MPDCCH (e.g., to perform channel estimates and/or demodulation for the MPDCCH) because MPDCCH transmissions are precoded with the same precoder as DMRS. In another example, the UE 120-2 may estimate the channel from the DMRS (e.g., the equivalent channel of one antenna port), and may use the channel estimate to receive the MPDCCH (e.g., to perform channel estimates and/or demodulation for the MPDCCH) because MPDCCH transmissions are transmitted from the same antenna port as the DMRS. However, DMRS is only present when the MPDCCH is present, and thus advanced channel estimation (e.g., warm-up estimation prior to the start of the MPDCCH) is not possible using DMRS.

For comparison, the PDCCH is CRS-based, meaning that CRS estimates are used to demodulate the PDCCH. For example, the UE 120-1 may estimate a precoder used for CRS, and may use the same precoder to receive the PDCCH because PDCCH transmissions are precoded with the same precoder as CRS. In another example, the UE 120-1 may estimate the channel from the CRS (e.g., the equivalent channel of one antenna port), and may use the channel estimate to receive the PDCCH (e.g., to perform channel estimates and/or demodulation for the PDCCH) because PDCCH transmissions are transmitted from the same antenna port as the CRS. Because CRS may be present regardless of whether the PDCCH is present, advanced precoder estimation (e.g., warm-up channel estimation) is possible using CRS. Furthermore, CRS-based channel estimation may permit additional performance improvements as compared to using only DMRS-based channel estimation. For example, CRS may mitigate some channel estimation error at edges of a band (e.g., sometimes referred to as band edge effects) because CRS allows for wider band channel estimation than DMRS.

However, because CRS and DMRS are independent (e.g., CRS and DMRS are transmitted using different antenna ports), using CRS for the DMRS-based MPDCCH is difficult, and/or may not be allowed by a wireless communication specification or standard. Some techniques and apparatuses described herein permit CRS to be used to receive the MPDCCH, such as for performing channel estimation for the MPDCCH, performing demodulation of the MPDCCH, and/or the like. Additional details are described below.

As indicated above, FIG. 4 is provided merely as an example. Other examples may differ from what is described with regard to FIG. 4.

Figure 5:
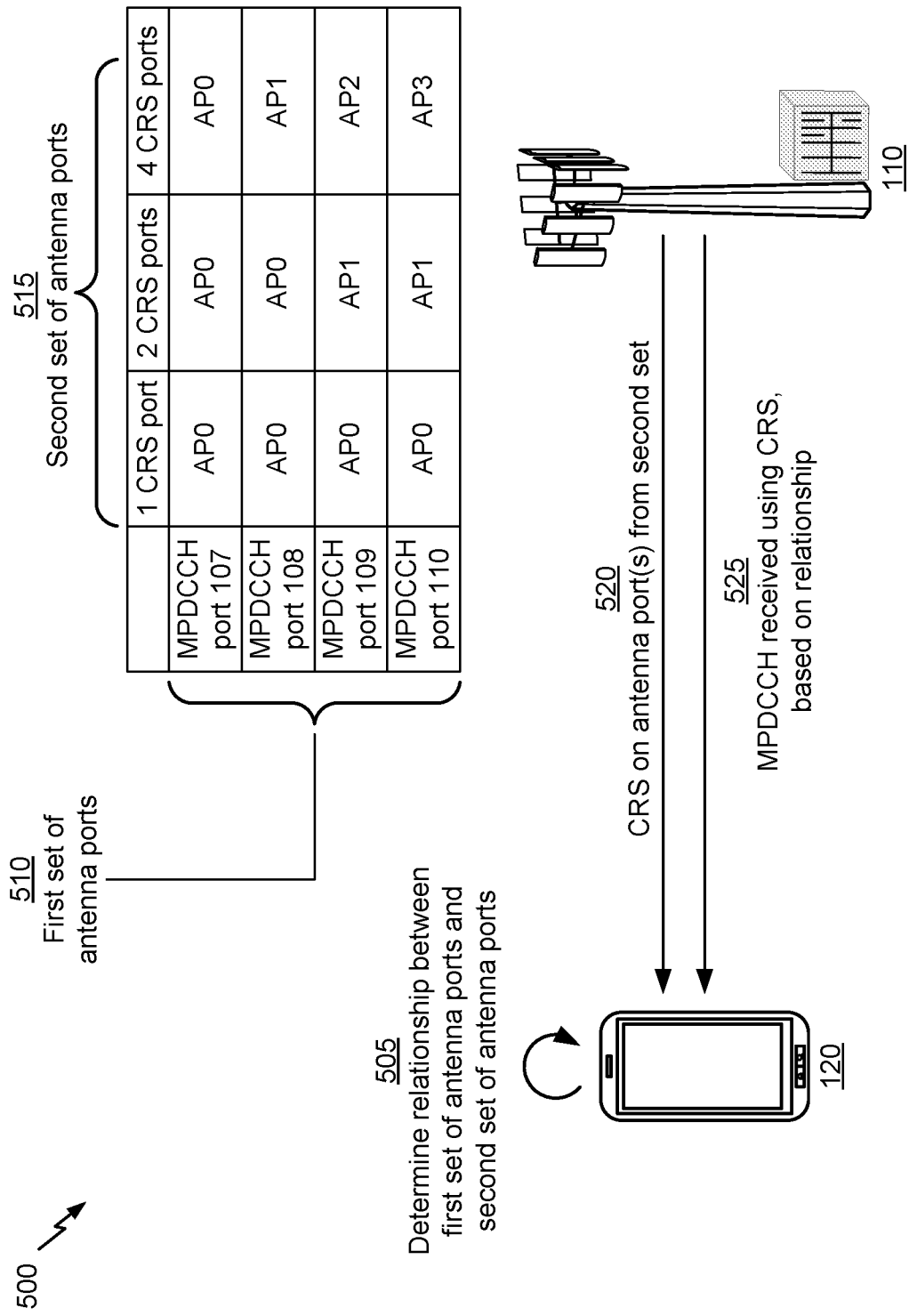
FIGS. 5 and 6 are diagrams illustrating examples of using cell-specific reference signals (CRS) for an MPDCCH, in accordance with various aspects of the present disclosure.

FIG. 5 is a diagram illustrating an example 500 of using CRS for an MPDCCH, in accordance with various aspects of the present disclosure.

As shown in FIG. 5, a UE 120, such as an eMTC UE, a UE in a CE mode, and/or the like, may communicate with a base station 110. The UE 120 may receive control information (e.g., DCI and/or the like) from the base station 110 via an MPDCCH, as described above in connection with FIG. 4.

As shown by reference number 505, the UE 120 may determine a relationship between a first set of antenna ports and a second set of antenna ports. As shown by reference number 510, the first set of antenna ports may be used for an MPDCCH and DMRS (e.g., since MPDCCH is DMRS-based). As shown by reference number 515, the second set of antenna ports may be used for CRS. As used herein, antenna ports from the first set may be referred to as MPDCCH ports or DMRS ports, and antenna ports from the second set may be referred to as CRS ports. As shown, different numbers of antenna ports may be used for CRS in different configurations, such as one antenna port, two antenna ports, four antenna ports, and/or the like.

In example 500, the relationship indicates that an MPDCCH port, included in the first set of antenna ports, and a CRS port, included in the second set of antenna ports, are the same. In some aspects, the relationship indicates a precoding relationship between an MPDCCH port and a CRS port, as described in more detail below in connection with FIG. 6. In some aspects, a scaling factor may be used to adjust estimates for different reference signals on a port. In this case, the base station 110 may indicate a scaling factor (e.g., a power boost value, a decibel value, and/or the like) for an MPDCCH port with respect to a CRS port, or vice versa. In some aspects, the scaling factor may be included in signaling for the precoder, or may be separately configured (e.g., in a SIB, in an RRC message, fixed in a wireless communications specification, and/or the like).

As shown in FIG. 5, the relationship may be based at least in part on a number of antenna ports included in the second set of antenna ports (e.g., a configured number of CRS ports). In some aspects, the base station 110 may signal (e.g., explicitly or implicitly), to the UE 120, the configured number of CRS ports. For example, the UE 120 may determine the configured number of CRS ports based at least in part on a cyclic redundancy check (CRC) of a physical broadcast channel (PBCH) communication (e.g., by performing multiple CRCs with different hypotheses as to the number of CRS ports, and determining which hypothesis is true).

For example, the relationship shown in FIG. 5 indicates that when a single (e.g., one) CRS port is configured (shown as AP0), then a first MPDCCH port (port 107) and the one CRS port use a same antenna port (AP0), a second MPDCCH port (port 108) and the one CRS port use a same antenna port (AP0), a third MPDCCH port (port 109) and the one CRS port use a same antenna port (AP0), and a fourth MPDCCH port (port 110) and the one CRS port use a same antenna port (AP0).

The relationship shown in FIG. 5 further indicates that when two CRS ports are configured (shown as AP0 and AP1), then a first MPDCCH port (port 107) and a first CRS port (shown as AP0) use a same antenna port (AP0), a second MPDCCH port (port 108) and the first CRS port use a same antenna port (AP0), a third MPDCCH port (port 109) and the second CRS port (shown as AP1) use a same antenna port (AP1), and a fourth MPDCCH port (port 110) and the second CRS port use a same antenna port (AP1).

The relationship shown in FIG. 5 further indicates that when four CRS ports are configured (shown as AP0, AP1, AP2, and AP3), then a first MPDCCH port (port 107) and a first CRS port (AP0) use a same antenna port (AP0), a second MPDCCH port (port 108) and a second CRS port (AP1) use a same antenna port (AP1), a third MPDCCH port (port 109) and a third CRS port (AP2) use a same antenna port (AP2), and a fourth MPDCCH port (port 110) and a fourth CRS port (AP3) use a same antenna port (AP3). The number of MPDCCH ports, the number of CRS ports, and the relationships between the MPDCCH ports and the CRS ports shown in FIG. 5 are provided as an example, and other examples are contemplated.

In some aspects, the relationship between the set of MPDCCH ports and the set of CRS ports may be predefined (e.g., according to a telecommunication standard) and/or hard-coded in memory of the UE 120 and/or the base station 110. For example, a table indicating the relationship, such as a table similar to the table shown in FIG. 5, may be stored in memory of the UE 120. In some aspects, the UE 120 may determine the relationship by identifying one or more entries in the table that correspond to a configured number of CRS ports (e.g., represented by a column in the table shown in FIG. 5). Additionally, or alternatively, the base station 110 may indicate, explicitly or implicitly, the relationship between the first set of antenna ports and the second set of antenna ports. For example, the UE 120 may store multiple such tables, and the base station 110 may indicate a table to be used by the UE 120 to determine the relationship, such as by indicating an index value corresponding to the table.

Thus, in some aspects, the relationship may be indicated to the UE 120 by the base station 110. For example, the relationship may be indicated using an index value that maps to a table, as described above. Additionally, or alternatively, the base station 110 may explicitly indicate the table to the UE 120 (e.g., by indicating values corresponding to the table entries). In either case, or in other cases, the base station 110 may indicate the relationship to the UE 120 in a radio resource control (RRC) message (e.g., which may be an RRC broadcast message, an RRC unicast message, and/or the like).

In some aspects, the relationship between the set of MPDCCH ports and the set of CRS ports may vary over time and/or may vary over frequency. For example, different relationships may be used at different times and/or at different frequencies. Thus, in some aspects, the relationship may be determined for a physical resource block (PRB) (e.g., having a time component and a frequency component) and/or for a set of PRBs. For example, the relationships indicated in the table of FIG. 5 may be applied for a single PRB and/or for a group of PRBs, and a different table may be used to indicate relationships for other PRB(s). In this way, time diversity, frequency diversity, and/or interference randomization may be achieved.

In some aspects, the relationship may be determined based at least in part on one or more parameters in order to achieve the time diversity, frequency diversity, and/or interference randomization indicated above. The one or more parameters may include, for example, a subframe number in which the MPDCCH is received, a physical resource block number in which the MPDCCH is received, a position of a physical resource block in which the MPDCCH is received within a narrowband, a cell identifier of a cell on which the UE 120 is camped, one or more radio network temporary identifiers associated with the UE 120, an upper layer parameter indicated to the UE 120 (e.g., by the base station 110), a radio frame number in which the MPDCCH is received, a type of search space associated with the MPDCCH (e.g., a common search space, a UE-specific search space, and/or the like), an operating mode of the MPDCCH (e.g., whether the MPDCCH is operating in a distributed mode or a localized mode), a start of an enhanced control channel element (ECCE) for the MPDCCH, a narrowband index associated with the MPDCCH, a frequency hopping configuration for the UE 120, an antenna port identifier associated with the MPDCCH, a number of antenna ports included in the second set of antenna ports, a coverage enhancement level or mode associated with the UE 120, a number of repetitions associated with the MPDCCH, and/or the like.

In some aspects, one or more of the above parameters (and/or other parameters) may be used as input to a pseudo-random number generator. In this case, the UE 120 may generate a pseudo-random number using one or more parameters, and may determine the relationship based at least in part on the pseudo-random number. In some aspects, the UE 120 may generate the pseudo-random number using a Gold code initialized by a seed. In this case, the UE 120 may determine the seed based at least in part on the one or more parameters. In this way, the time diversity, frequency diversity, and/or interference randomization indicated above may be achieved.

In some aspects, the MPDCCH may be configured to operate using a localized operating mode, with single port transmission and all tones precoded using the same precoder. In the localized MPDCCH operating mode, the base station 110 may transmit channel state information (CSI) reference signals (CSI-RS) to the UE 120, and the UE 120 may transmit CSI feedback (e.g., a channel quality indicator (CQI) value, a rank indication (RI) value, a precoding matrix indicator (PMI) value, and/or the like) to the base station 110. In some cases, the base station 110 may transmit CRS to the UE 120, and the UE 120 may transmit CSI feedback based on the CRS to the base station 110. In yet another example, the UE 120 may transmit a sounding reference signal (SRS) that the base station 110 can use to estimate the channel, and the base station 110 may use the estimated channel (e.g., in a time-division duplex system, where there is uplink-downlink channel reciprocity) to support beamforming for the UE 120. The base station 110 may use this CSI feedback and/or SRS to support beamforming for the UE 120 to improve performance. In this case, CRS-based channel estimation may need to be disabled for one or more antenna ports and/or MPDCCH candidates in order to support beamforming on those antenna ports and/or for those MPDCCH candidates.

However, the MPDCCH may alternatively be configured to operate using a distributed operating mode, with dual port transmission and precoder cycling (e.g., where two DMRS ports with two precoders are used to transmit different tones). The distributed operating mode may be used for transmit diversity (e.g., precoder cycling and/or frequency diversity) without using CSI feedback from the UE 120. In this mode, performance may be improved by supporting CRS-based channel estimation.

To support both the localized operating mode and the distributed operating mode of the MPDCCH, the UE 120 may determine one or more antenna ports (e.g., MPDCCH ports) and/or MPDCCH candidates for which CRS-based channel estimation is disabled (e.g., for beamforming ports and/or candidates), and/or may determine one or more antenna ports and/or MPDCCH candidates for which CRS-based channel estimation is enabled (e.g., for precoder cycling ports and/or candidates). Additionally, or alternatively, the relationship may indicate one or more antenna ports (e.g., MPDCCH ports) and/or MPDCCH candidates for which a most recent precoding matrix indicator (PMI) value, reported by the UE 120 (e.g., within a configured time period), is to be used for determining that relationship between the MPDCCH ports and the CRS ports. In this way, the relationship between at least some MPDCCH ports and CRS ports need not used a fixed precoder so that beamforming can be supported. In some aspects, the above information may be indicated by the base station 110, and/or may be indicated by the relationship. In some aspects, the enabling or disabling of CRS-based channel estimation per port and/or per MPDCCH candidate may be employed in time-division duplex (TDD) communication systems (e.g., for non-codebook based beamforming). Additionally, or alternatively, the use of the most recent PMI value may be employed in frequency-division duplex (FDD) communication systems.

In some aspects, the UE 120 may determine (e.g., based at least in part on an indication from the base station 110) whether a relationship between an MPDCCH port and a CRS port is fixed across all physical resource blocks (e.g., for beamforming ports) or varies across different PRBs (e.g., for precoder cycling ports). In this way, both the localized operating mode and the distributed operating mode of the MPDCCH may be supported. In some aspects, the localized operating mode with beamforming ports may apply only when the MPDCCH carries unicast information (e.g., because beamforming is not typically used for broadcast information that needs to reach multiple UEs 120). Thus, in some aspects, a fixed relationship may only apply to unicast communications, and not to broadcast communications.

In some aspects, the relationship may indicate two MPDCCH ports that are the same and/or that two MPDCCH ports are the same (e.g., that MPDCCH ports 107 and 109, in the first set of antenna ports, are the same). In this way, additional samples may be available for channel estimation of the MPDCCH and performance may be improved.

In some aspects, different MPDCCHs, radio network temporary identifiers (RNTIs), search spaces, and/or the like may be associated with different relationships between the MPDCCH ports and the CRS ports. In this case, the UE 120 may determine the relationship based at least in part on an RNTI associated with the MPDCCH, a search space identifier associated with the MPDCCH, and/or the like.

As shown by reference number 520, the base station 110 may transmit, and the UE 120 may receive, CRS on one or more antenna ports of the second set of antenna ports (e.g., used for CRS). Because such CRS ports may be the same as the MPDCCH ports (or may have a specified relationship, such as being the same with a different scaling factor, having a precoding relationship, and/or the like), the received CRS may be used to receive the MPDCCH, as described below.

As shown by reference number 525, the base station 110 may transmit the MPDCCH (e.g., may transmit control information on the MPDCCH), and the UE 120 may receive the MPDCCH, using the CRS, based at least in part on the determined relationship between the first set of antenna ports and the second set of antenna ports. In some aspects, the UE 120 may obtain a channel estimation for the MPDCCH using at least the CRS, and/or may demodulate the MPDCCH based at least in part on the channel estimation. For example, the UE 120 may obtain a channel estimation using the CRS received on CRS port(s), may determine a corresponding channel estimation for MPDCCH port(s) based at least in part on the relationship between the CRS port(s) and the MPDCCH port(s), and may demodulate the MPDCCH based at least in part on the channel estimation for the MPDCCH port(s).

In some aspects, CRS-based channel estimation for the MPDCCH may be enabled or disabled. In this case, the UE 120 may perform one or more operations described above (e.g., may determine the relationship between MPDCCH ports and CRS ports, may receive CRS for the MPDCCH, may receive the MPDCCH using the CRS, and/or the like) when CRS-based channel estimation for the MPDCCH is enabled, or may refrain from performing the one or more operations when CRS-based channel estimation for the MPDCCH is disabled. In some aspects, CRS-based channel estimation for the MPDCCH may be enabled or disabled based at least in part on whether the MPDCCH carries broadcast information or unicast information.

For example, in some aspects, CRS-based channel estimation for the MPDCCH may be prohibited when the MPDCCH carries broadcast information, thereby improving compatibility with legacy UEs 120 that do not support CRS-based channel estimation for the MPDCCH. Alternatively, the base station 110 may signal an indication of whether the MPDCCH supports CRS-based channel estimation when the MPDCCH carries broadcast information, and the UE 120 may perform one or more operations described above based at least in part on the indication. In some aspects, the indication is signaled in system information (e.g., in a system information block (SIB) and/or the like). Additionally, or alternatively, the indication may include a radio network temporary identifier (RNTI) associated with the MPDCCH, a search space identifier associated with the MPDCCH, and/or the like. The RNTI for a broadcast MPDCCH may include, for example, a random access RNTI (RA-RNTI), a paging RNTI (P-RNTI), a group RNTI (G-RNTI), a cell RNTI (C-RNTI) (e.g., a temporary C-RNTI), and/or the like. If CRS-based channel estimation is supported by the MPDCCH, a UE 120 that supports CRS-based channel estimation of the MPDCCH may save power by terminating channel estimation faster due to a larger number of samples (e.g., CRS samples and/or DMRS samples) capable of being used for channel estimation of the MPDCCH.

In some aspects, separate or different signaling may be used for different MPDCCHs, RNTIs, search spaces, coverage enhancement (CE) levels, CE modes, and/or the like. Thus, CRS-based channel estimation may be enabled or disabled per MPDCCH, per RNTI, per search space, per CE level (e.g., per physical random access channel (PRACH) coverage level), per CE mode, and/or the like. Additionally, or alternatively, other types of signaling related to CRS-based channel estimation (e.g., a relationship between MPDCCH ports and CRS ports, a relative power boost of DMRS ports compared to CRS ports, and/or the like) may be signaled per MPDCCH, per RNTI, per search space, per CE level, per CE mode, and/or the like.

In some aspects, CRS-based channel estimation for the MPDCCH may be enabled when the MPDCCH carries unicast information, if the UE 120 supports CRS-based channel estimation for the MPDCCH, thereby avoiding any incompatibility issues with legacy UEs 120 that do not support CRS-based channel estimation for the MPDCCH. In this case, if the UE 120 supports CRS-based channel estimation for the MPDCCH, then the UE 120 may perform one or more operations described above based at least in part on a determination that the MPDCCH carries unicast information.

In some aspects (e.g., when the MPDCCH carries unicast information), the UE 120 may report a capability of the UE 120 indicating that the UE 120 supports CRS-based channel estimation from the MPDCCH, and may perform one or more operations described above based at least in part on reporting the capability. Additionally, or alternatively, the base station 110 may signal an indication of whether the MPDCCH supports CRS-based channel estimation when the MPDCCH carries unicast information, and the UE 120 may perform one or more operations described above based at least in part on the indication. In some aspects, the indication is signaled in system information (e.g., in a SIB and/or the like). Additionally, or alternatively, the indication may include an RNTI associated with the MPDCCH, a search space identifier associated with the MPDCCH, and/or the like. The RNTI for a unicast MPDCCH may include, for example, a cell RNTI (C-RNTI), a semi-persistent scheduling (SPS) C-RNTI, and/or the like. As indicated above, separate or different signaling may be used for different CE levels, CE modes, and/or the like. Thus, CRS-based channel estimation may be enabled or disabled per CE level, per CE mode, and/or the like.

As indicated above, FIG. 5 is provided as an example. Other examples may differ from what is described with respect to FIG. 5.

Figure 6:
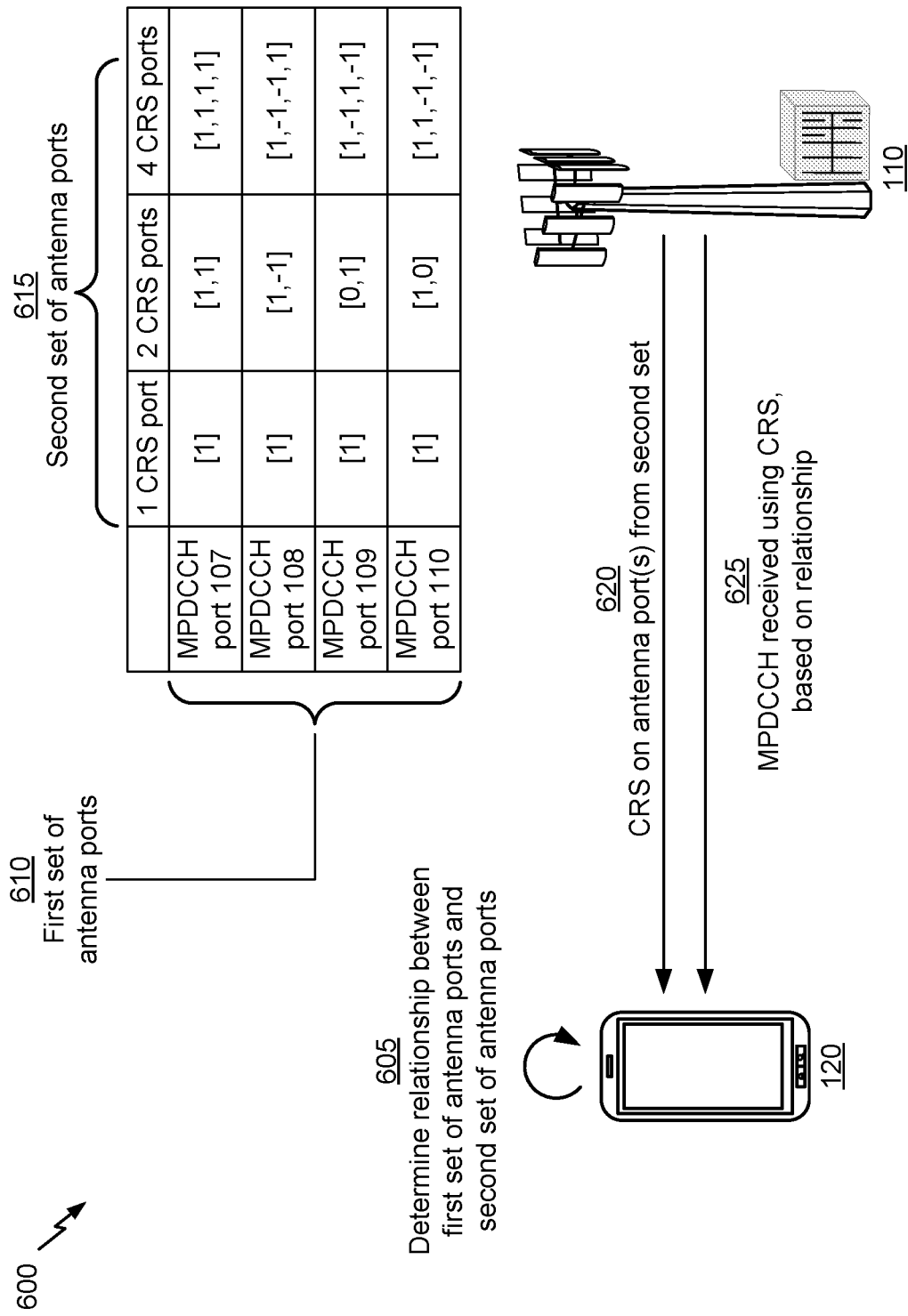

FIG. 6 is a diagram illustrating another example 600 of using CRS for an MPDCCH, in accordance with various aspects of the present disclosure.

As shown by reference number 605, a UE 120 may determine a relationship between a first set of antenna ports and a second set of antenna ports, in a similar manner as described above in connection with FIG. 5. As shown by reference number 610, the first set of antenna ports may be used for an MPDCCH and DMRS (e.g., since MPDCCH is DMRS-based), as described above in connection with FIG. 5. As shown by reference number 615, the second set of antenna ports may be used for CRS, as described above in connection with FIG. 5.

In example 600, the relationship indicates a precoding relationship between an MPDCCH port and a CRS port. The precoding relationship may indicate a manner in which channel estimates from one or more CRS ports are to be combined to estimate a channel (e.g., an MPDCCH) for one or more MPDCCH ports. From a base station perspective, the precoding relationship may indicate a manner in which CRS ports and MPDCCH ports are mapped to physical antennas. As shown in FIG. 6, the relationship may be based at least in part on a number of antenna ports included in the second set of antenna ports (e.g., a configured number of CRS ports), as described above in connection with FIG. 5.

For example, the relationship shown in FIG. 6 indicates that when a single (e.g., one) CRS port is configured, then a first MPDCCH port (port 107), a second MPDCCH port (port 108), a third MPDCCH port (port 109), and a fourth MPDCCH port (port 110) all have a relationship of [1] with the CRS port. As described above in connection with FIG. 3, this may indicate that all of the MPDCCH ports are related to the CRS port via the precoder [1], and 1 times the expression representing the CRS port (e.g., CRS1) is equal to the expression representing the MPDCCH port (e.g., optionally modified using an indicated scaling factor, as described above in connection with FIG. 5).

The relationship shown in FIG. 6 further indicates that when two CRS ports are configured, then a first MPDCCH port (port 107) is related to the first CRS port and the second CRS port via the precoder [1,1] (e.g., MPDCCH port 107=CRS1+CRS2), a second MPDCCH port (port 108) is related to the first CRS port and the second CRS port via the precoder [1,−1] (e.g., MPDCCH port 108=CRS1−CRS2), a third MPDCCH port (port 109) is related to the first CRS port and the second CRS port via the precoder [0,1] (e.g., MPDCCH port 109=CRS2), and a fourth MPDCCH port (port 110) is related to the first CRS port and the second CRS port via the precoder [1,0] (e.g., MPDCCH port 110=CRS1).

The relationship shown in FIG. 6 further indicates that when four CRS ports are configured, then a first MPDCCH port (port 107) is related to the four CRS ports via the precoder [1,1,1,1] (e.g., MPDCCH port 107=CRS1+CRS2+CRS3+CRS4), a second MPDCCH port (port 108) is related to the four CRS ports via the precoder [1,−1,−1,1] (e.g., MPDCCH port 108=CRS1−CRS2−CRS3+CRS4), a third MPDCCH port (port 109) is related to the four CRS ports via the precoder [1,−1,1,−1] (e.g., MPDCCH port 109=CRS1−CRS2+CRS3−CRS4), and a fourth MPDCCH port (port 110) is related to the four CRS ports via the precoder [1,1,−1,−1] (e.g., MPDCCH port 110=CRS1+CRS2−CRS3−CRS4). The number of MPDCCH ports, the number of CRS ports, and the precoding relationships between the MPDCCH ports and the CRS ports shown in FIG. 6 are provided as an example, and other examples are contemplated.

As described above in connection with FIG. 5, the relationship between the set of MPDCCH ports and the set of CRS ports may be predefined (e.g., according to a telecommunication standard) and/or hard-coded in memory of the UE 120 and/or the base station 110. For example, a table indicating the relationship, such as a table similar to the table shown in FIG. 6, may be stored in memory of the UE 120. In some aspects, the UE 120 may determine the relationship by identifying one or more entries in the table that correspond to a configured number of CRS ports (e.g., represented by a column in the table shown in FIG. 6). Additionally, or alternatively, the base station 110 may indicate, explicitly or implicitly, the relationship between the first set of antenna ports and the second set of antenna ports. For example, the UE 120 may store multiple such tables, and the base station 110 may indicate a table to be used by the UE 120 to determine the relationship, such as by indicating an index value corresponding to the table.

Thus, in some aspects, the relationship may be indicated to the UE 120 by the base station 110. For example, the relationship may be indicated using an index value that maps to a table, as described above. Additionally, or alternatively, the base station 110 may explicitly indicate the table to the UE 120 (e.g., by indicating values corresponding to the table entries). In either case, or in other cases, the base station 110 may indicate the relationship to the UE 120 in a radio resource control (RRC) message (e.g., which may be an RRC broadcast message, an RRC unicast message, and/or the like).

In some aspects, the precoding relationship may change over time and/or frequency, in a similar manner as described above in connection with FIG. 5. In some aspects, the precoding relationship may change over time and/or frequency with a different period than a legacy precoding cycling period (e.g., for a PDCCH that permits cross-subframe channel estimation). In some aspects, the period may be less than a legacy precoding cycling period. For example, the legacy precoding cycling period may be more than one subframe, and the precoding relationship may vary with a period of one subframe. In this way, better transmit diversity may be provided in the time domain and/or frequency domain.

As shown by reference number 620, the base station 110 may transmit, and the UE 120 may receive, CRS on one or more antenna ports of the second set of antenna ports (e.g., used for CRS), as described above in connection with FIG. 5. As shown by reference number 625, the base station 110 may transmit the MPDCCH (e.g., may transmit control information on the MPDCCH), and the UE 120 may receive the MPDCCH, using the CRS, based at least in part on the determined relationship between the first set of antenna ports and the second set of antenna ports, as described above in connection with FIG. 5. Additional operations described above in connection with FIG. 5 may be performed in connection with the operations described in connection with FIG. 6.

As indicated above, FIG. 6 is provided as an example. Other examples may differ from what is described with respect to FIG. 6.

Figure 7:
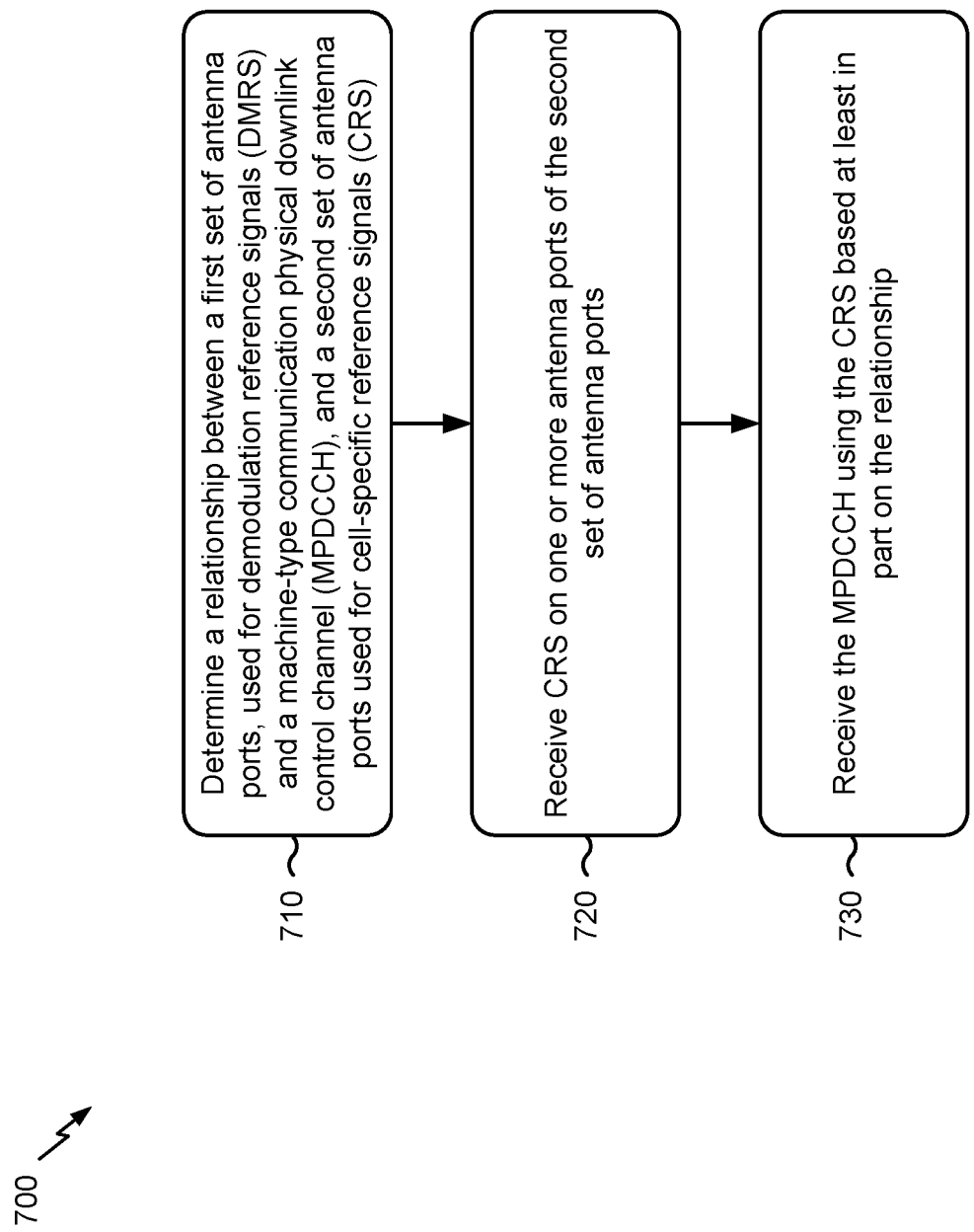
FIGS. 7 and 8 are diagrams illustrating example processes performed, for example, by a user equipment, in accordance with various aspects of the present disclosure.

FIG. 7 is a diagram illustrating an example process 700 performed, for example, by a UE, in accordance with various aspects of the present disclosure. Example process 700 is an example where a UE (e.g., UE 120 and/or the like) performs operations associated with using CRS for an MPDCCH.

As shown in FIG. 7, in some aspects, process 700 may include determining a relationship between a first set of antenna ports, used for DMRS associated with an MPDCCH and used for the MPDCCH, and a second set of antenna ports used for CRS (block 710). For example, the UE (e.g., using controller/processor 280 and/or the like) may determine a relationship between a first set of antenna ports, used for DMRS associated with an MPDCCH and used for the MPDCCH, and a second set of antenna ports used for CRS, as described above in connection with FIGS. 5-6.

As further shown in FIG. 7, in some aspects, process 700 may include receiving CRS on one or more antenna ports of the second set of antenna ports (block 720). For example, the UE (e.g., using antenna 252, DEMOD 254, MIMO detector 256, receive processor 258, controller/processor 280, and/or the like) may receive CRS on one or more antenna ports of the second set of antenna ports, as described above in connection with FIGS. 5-6.

As further shown in FIG. 7, in some aspects, process 700 may include receiving the MPDCCH using at least the CRS based at least in part on the relationship (block 730). For example, the UE (e.g., using antenna 252, DEMOD 254, MIMO detector 256, receive processor 258, controller/processor 280, and/or the like) may receive the MPDCCH using at least the CRS based at least in part on the relationship, as described above in connection with FIGS. 5-6.

Process 700 may include additional aspects, such as any single aspect or any combination of aspects described below and/or in connection with one or more other processes described elsewhere herein.

In a first aspect, receiving the MPDCCH comprises demodulating the MPDCCH based at least in part on a channel estimation obtained based at least in part on the CRS.

In a second aspect, alone or in combination with the first aspect, the relationship indicates that a first antenna port, of the first set of antenna ports, and a second antenna port, of the second set of antenna ports, are the same.

In a third aspect, alone or in combination with one or more of the first and second aspects, the relationship indicates a precoding relationship between at least one first antenna port, of the first set of antenna ports, and at least one second antenna port of the second set of antenna ports.

In a fourth aspect, alone or in combination with one or more of the first through third aspects, the precoding relationship indicates a manner in which channel estimates from at least one antenna port, of the second set of antenna ports, are to be combined to estimate a channel for at least one antenna port of the first set of antenna ports.

In a fifth aspect, alone or in combination with one or more of the first through fourth aspects, the relationship is determined based at least in part on a number of antenna ports included in the second set of antenna ports.

In a sixth aspect, alone or in combination with one or more of the first through fifth aspects, the number of antenna ports included in the second set of antenna ports is determined based at least in part on a cyclic redundancy check of a physical broadcast channel communication.

In a seventh aspect, alone or in combination with one or more of the first through sixth aspects, the relationship is predefined or hard-coded in memory of the UE.

In an eighth aspect, alone or in combination with one or more of the first through seventh aspects, the relationship is indicated to the UE by a base station.

In a ninth aspect, alone or in combination with one or more of the first through eighth aspects, the relationship is indicated to the UE in a radio resource control (RRC) message, is indicated to the UE in a system information block (SIB) message, or a combination thereof.

In a tenth aspect, alone or in combination with one or more of the first through ninth aspects, the relationship varies over at least one of time or frequency.

In an eleventh aspect, alone or in combination with one or more of the first through tenth aspects, the relationship is determined for a physical resource block.

In a twelfth aspect, alone or in combination with one or more of the first through eleventh aspects, the relationship is determined based at least in part on one or more parameters, wherein the one or more parameters include at least one of: a subframe number in which the MPDCCH is received, a physical resource block number in which the MPDCCH is received, a position of a physical resource block in which the MPDCCH is received within a narrowband, a cell identifier of a cell on which the UE is camped, a radio network temporary identifier associated with the UE, an upper layer parameter indicated to the UE, a radio frame number in which the MPDCCH is received, a type of search space associated with the MPDCCH, an operating mode of the MPDCCH, a start of an enhanced control channel element for the MPDCCH, a narrowband index associated with the MPDCCH, a frequency hopping configuration for the UE, an antenna port identifier associated with the MPDCCH, a number of antenna ports included in the second set of antenna ports, a coverage enhancement level or mode associated with the UE, a number of repetitions associated with the MPDCCH, or a combination thereof.

In a thirteenth aspect, alone or in combination with one or more of the first through twelfth aspects, the relationship is determined based at least in part on a pseudo-random number generated using the one or more parameters.

In a fourteenth aspect, alone or in combination with one or more of the first through thirteenth aspects, the pseudo-random number is generated using a Gold code initialized by a seed, wherein the seed is determined based at least in part on the one or more parameters.

In a fifteenth aspect, alone or in combination with one or more of the first through fourteenth aspects, the relationship is a precoding relationship, and the precoding relationship changes over time or frequency with a different period than a legacy precoding cycling period.

In a sixteenth aspect, alone or in combination with one or more of the first through fifteenth aspects, the relationship is determined and the MPDCCH is received using the CRS based at least in part on a determination that CRS-based channel estimation for the MPDCCH is enabled.

In a seventeenth aspect, alone or in combination with one or more of the first through sixteenth aspects, the MPDCCH is associated with broadcast information, and the MPDCCH is received using the CRS based at least in part on an indication that the MPDCCH permits CRS-based channel estimation.

In an eighteenth aspect, alone or in combination with one or more of the first through seventeenth aspects, the indication identifies a radio network temporary identifier associated with the MPDCCH.

In a nineteenth aspect, alone or in combination with one or more of the first through eighteenth aspects, the indication identifies a search space associated with the MPDCCH.

In a twentieth aspect, alone or in combination with one or more of the first through nineteenth aspects, the indication is included in a system information block.

In a twenty-first aspect, alone or in combination with one or more of the first through twentieth aspects, different signaling related to the CRS-based channel estimation is used for different MPDCCHs, radio network temporary identifiers, search spaces, coverage enhancement levels, or coverage enhancement modes.

In a twenty-second aspect, alone or in combination with one or more of the first through twenty-first aspects, CRS-based channel estimation is not permitted for MPDCCHs associated with broadcast information.

In a twenty-third aspect, alone or in combination with one or more of the first through twenty-second aspects, the MPDCCH is received using the CRS based at least in part on a determination that the MPDCCH is associated with unicast information.

In a twenty-fourth aspect, alone or in combination with one or more of the first through twenty-third aspects, the MPDCCH is associated with unicast information, and the MPDCCH is received using the CRS based at least in part on a capability report indicating that the UE supports CRS-based channel estimation for the MPDCCH.

In a twenty-fifth aspect, alone or in combination with one or more of the first through twenty-fourth aspects, the MPDCCH is associated with unicast information, and the MPDCCH is received using the CRS based at least in part on an indication that the MPDCCH permits CRS-based channel estimation.

In a twenty-sixth aspect, alone or in combination with one or more of the first through twenty-fifth aspects, the indication identifies a radio network temporary identifier associated with the MPDCCH.

In a twenty-seventh aspect, alone or in combination with one or more of the first through twenty-sixth aspects, the indication is included in a system information block.

In a twenty-eighth aspect, alone or in combination with one or more of the first through twenty-seventh aspects, different signaling related to CRS-based channel estimation is used for different coverage enhancement levels or coverage enhancement modes.

In a twenty-ninth aspect, alone or in combination with one or more of the first through twenty-eighth aspects, the relationship is determined based at least in part on a radio network temporary identifier or a search space associated with the MPDCCH.

In a thirtieth aspect, alone or in combination with one or more of the first through twenty-ninth aspects, different radio network temporary identifiers or different search spaces are associated with different relationships between the first set of antenna ports and the second set of antenna ports.

In a thirty-first aspect, alone or in combination with one or more of the first through thirtieth aspects, the MPDCCH is received using the CRS based at least in part on a determination that CRS-based channel estimation for the MPDCCH is enabled for at least one of the one or more antenna ports on which the CRS is received or an MPDCCH candidate corresponding to the MPDCCH.

In a thirty-second aspect, alone or in combination with one or more of the first through thirty-first aspects, the relationship indicates at least one antenna port or MPDCCH candidate for which CRS-based channel estimation for the MPDCCH is enabled and at least one antenna port or MPDCCH candidate for which CRS-based channel estimation for the MPDCCH is disabled.

In a thirty-third aspect, alone or in combination with one or more of the first through thirty-second aspects, the relationship indicates at least one antenna port or MPDCCH candidate for which a previous precoding matrix indicator value, reported by the UE, is to be used for determining the relationship between the first set of ports and the second set of ports.

In a thirty-fourth aspect, alone or in combination with one or more of the first through thirty-third aspects, the relationship indicates at least one antenna port or MPDCCH candidate for which the relationship is fixed across all physical resource blocks.

In a thirty-fifth aspect, alone or in combination with one or more of the first through thirty-fourth aspects, the relationship is fixed across all physical resource blocks for unicast communications.

In a thirty-sixth aspect, alone or in combination with one or more of the first through thirty-fifth aspects, the relationship indicates at least one antenna port for which the relationship varies across different physical resource blocks.

In a thirty-seventh aspect, alone or in combination with one or more of the first through thirty-sixth aspects, a power boost value for a first antenna port, of the first set of antenna ports, is signaled with respect to at least one second antenna port of the second set of antenna ports.

In a thirty-eighth aspect, alone or in combination with one or more of the first through thirty-seventh aspects, the relationship indicates two or more antenna ports, of the first set of antenna ports, that are the same.

In a thirty-ninth aspect, alone or in combination with one or more of the first through thirty-eighth aspects, signaling is used to enable or disable CRS-based channel estimation for MPDCCHs associated with broadcast information, for MPDCCHs associated with unicast information, for a radio network temporary identifier, for a search space, for a coverage enhancement level, for a coverage enhancement mode, or a combination thereof.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
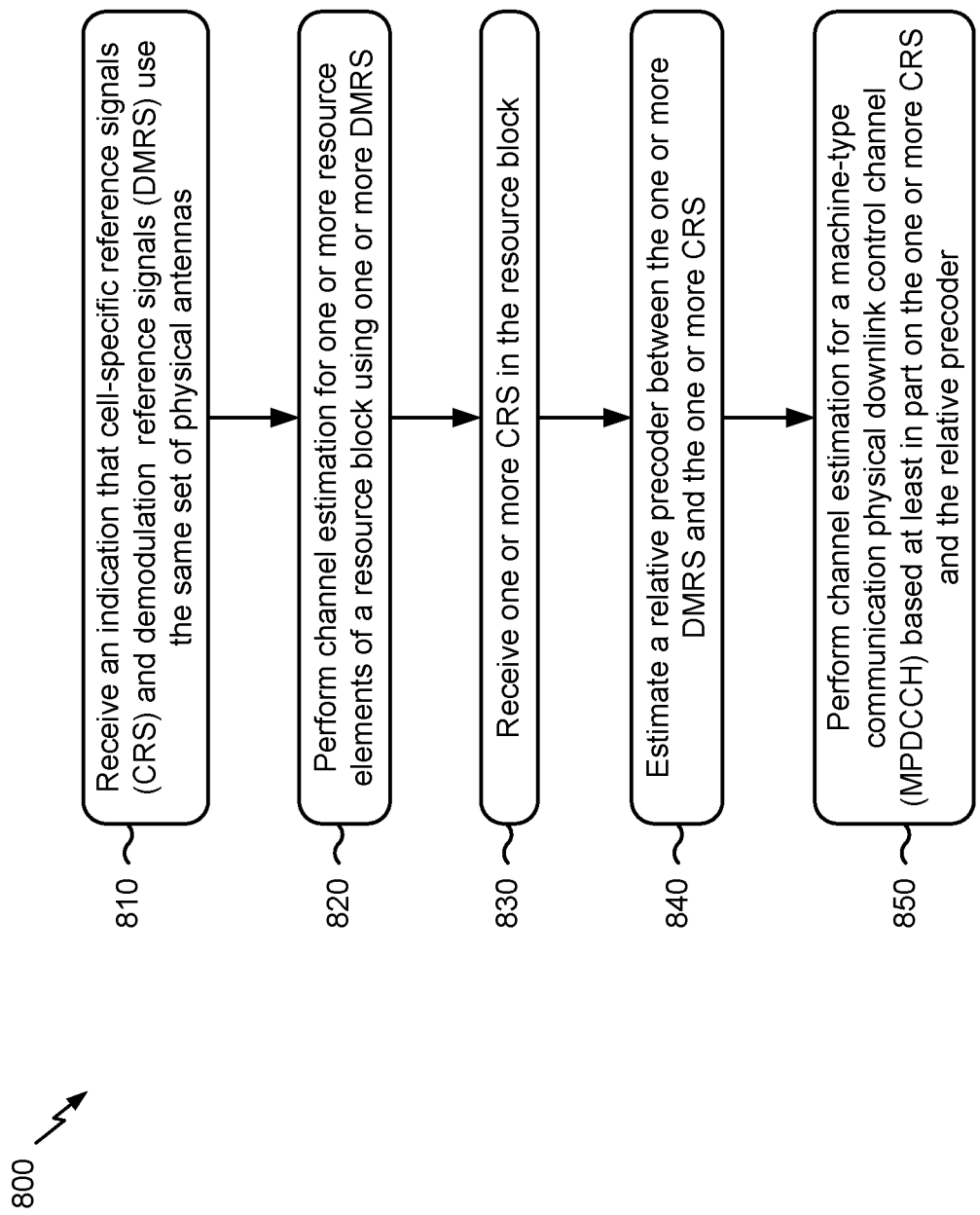

FIG. 8 is a diagram illustrating an example process 800 performed, for example, by a UE, in accordance with various aspects of the present disclosure. Example process 800 is an example where a UE (e.g., UE 120 and/or the like) performs operations associated with using CRS for an MPDCCH.

As shown in FIG. 8, in some aspects, process 800 may include receiving an indication that CRS and DMRS use the same set of physical antennas (block 810). For example, the UE (e.g., using antenna 252, DEMOD 254, MIMO detector 256, receive processor 258, controller/processor 280, and/or the like) may receive an indication that CRS and DMRS use the same set of physical antennas.

As further shown in FIG. 8, in some aspects, process 800 may include performing channel estimation for one or more resource elements of a resource block using one or more DMRS (block 820). For example, the UE (e.g., using antenna 252, DEMOD 254, MIMO detector 256, receive processor 258, controller/processor 280, and/or the like) may perform channel estimation for one or more resource elements of a resource block using one or more DMRS.

As further shown in FIG. 8, in some aspects, process 800 may include receiving one or more CRS in the resource block (block 830). For example, the UE (e.g., using antenna 252, DEMOD 254, MIMO detector 256, receive processor 258, controller/processor 280, and/or the like) may receive one or more CRS in the resource block.

As further shown in FIG. 8, in some aspects, process 800 may include estimating a relative precoder between the one or more DMRS and the one or more CRS (block 840). For example, the UE (e.g., using antenna 252, DEMOD 254, MIMO detector 256, receive processor 258, controller/processor 280, and/or the like) may estimate a relative precoder between the one or more DMRS and the one or more CRS.

As further shown in FIG. 8, in some aspects, process 800 may include performing channel estimation for an MPDCCH based at least in part on the one or more CRS and the relative precoder (block 850). For example, the UE (e.g., using antenna 252, DEMOD 254, MIMO detector 256, receive processor 258, controller/processor 280, and/or the like) may perform channel estimation for an MPDCCH based at least in part on the one or more CRS and the relative precoder.

Process 800 may include additional aspects, such as any single aspect or any combination of aspects described below and/or in connection with one or more other processes described elsewhere herein.

In some aspects, the relative precoder is selected from a plurality of precoders in a code book.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   determining a relationship between each of a first set of antenna ports, used for demodulation reference signals (DMRS) associated with a machine-type communication physical downlink control channel (MPDCCH) and used for the MPDCCH, and each of a second set of antenna ports used for cell-specific reference signals (CRS);
   receiving the CRS on one or more antenna ports of the second set of antenna ports; and
   receiving the MPDCCH using at least the CRS based at least in part on the relationship,
   wherein at least one of:
      the relationship:
         is determined based at least in part on a radio network temporary identifier or a search space associated with the MPDCCH,
         indicates a first antenna port, of the first set of antenna ports, or MPDCCH candidate for which a CRS-based channel estimation for the MPDCCH is enabled and a second antenna port or MPDCCH candidate for which the CRS-based channel estimation for the MPDCCH is disabled, or indicates the first antenna port or MPDCCH candidate for a previous precoding matrix indicator value, reported by the UE, for determining the relationship between each of the first set of antenna ports and each of the second set of antenna ports,
   signaling is used to enable or disable the CRS-based channel estimation for the MPDCCH associated with broadcast information or unicast information, for the radio network temporary identifier, for the search space, for a coverage enhancement level or mode, or a combination thereof,
   the MPDCCH is associated with the unicast information, and is received using the CRS based at least in part on a capability report indicating that the UE supports the CRS-based channel estimation for the MPDCCH, or
   a power boost value associated with the first antenna port is signaled with respect to a third antenna port of the second set of antenna ports.

2. The method of claim 1, wherein receiving the MPDCCH comprises demodulating the MPDCCH based at least in part on the CRS-based channel estimation.

3. The method of claim 1, wherein the relationship indicates that the first antenna port and the third antenna port are the same.

4. The method of claim 1, wherein the relationship indicates a precoding relationship between at least one first antenna port, of the first set of antenna ports, and at least one second antenna port of the second set of antenna ports.

5. The method of claim 4, wherein the precoding relationship indicates a manner in which channel estimates from the third antenna port are to be combined to estimate a channel for the first antenna port.

6. The method of claim 1, wherein the relationship is determined based at least in part on a number of antenna ports included in the second set of antenna ports.

7. The method of claim 1, wherein the relationship is predefined or hard-coded in memory of the UE.

8. The method of claim 1, wherein the relationship is indicated to the UE by a base station, is indicated to the UE in a radio resource control (RRC) message, is indicated to the UE in a system information block (SIB) message, or a combination thereof.

9. The method of claim 1, wherein the relationship varies over at least one of time or frequency.

10. The method of claim 1, wherein the relationship is determined for a physical resource block.

11. The method of claim 1, wherein the relationship is determined based at least in part on one or more parameters, wherein the one or more parameters include at least one of:
   a subframe number in which the MPDCCH is received,
   a physical resource block number in which the MPDCCH is received,
   a position of a physical resource block in which the MPDCCH is received within a narrowband,
   a cell identifier of a cell on which the UE is camped,
   the radio network temporary identifier,
   an upper layer parameter indicated to the UE,
   a radio frame number in which the MPDCCH is received,
   a type of the search space,
   an operating mode of the MPDCCH,
   a start of an enhanced control channel element for the MPDCCH,
   a narrowband index associated with the MPDCCH,
   a frequency hopping configuration for the UE,
   an antenna port identifier associated with the MPDCCH, a number of antenna ports included in the second set of antenna ports, the coverage enhancement level or mode, a number of repetitions associated with the MPDCCH, or a combination thereof.

12. The method of claim 11, wherein the relationship is determined based at least in part on a pseudo-random number generated using a Gold code initialized by a seed, wherein the seed is determined based at least in part on the one or more parameters.

13. The method of claim 1, wherein the relationship is determined and the MPDCCH is received using the CRS based at least in part on a determination that the CRS-based channel estimation for the MPDCCH is enabled.

14. The method of claim 1, wherein the MPDCCH is associated with broadcast information, and wherein the MPDCCH is received using the CRS based at least in part on an indication that the MPDCCH permits the CRS-based channel estimation.

15. The method of claim 14, wherein the indication is included in a system information block.

16. The method of claim 1, wherein the signaling is used to enable or disable the CRS-based channel estimation for the MPDCCH associated with the broadcast information or the unicast information, for the radio network temporary identifier, for the search space, for a coverage enhancement level or mode, or a combination thereof.

17. The method of claim 1, wherein the MPDCCH is associated with the unicast information, and is received using the CRS based at least in part on the capability report.

18. The method of claim 1, wherein the relationship is determined based at least in part on the radio network temporary identifier or the search space.

19. The method of claim 1, wherein different radio network temporary identifiers or different search spaces are associated with different relationships between the first set of antenna ports and the second set of antenna ports.

20. The method of claim 1, wherein the relationship indicates the first antenna port or MPDCCH candidate for which the CRS-based channel estimation for the MPDCCH is enabled and the second antenna port or MPDCCH candidate for which the CRS-based channel estimation for the MPDCCH is disabled.

21. The method of claim 1, wherein the relationship indicates the first antenna port or MPDCCH candidate for which the previous precoding matrix indicator value is to be used for determining the relationship between each of the first set of antenna ports and each of the second set of antenna ports.

22. The method of claim 1, wherein the power boost value is signaled with respect to the third antenna port.

23. A user equipment (UE) for wireless communication, comprising:

a memory; and one or more processors coupled to the memory, the one or more processors configured to:

determine a relationship between each of a first set of antenna ports, used for demodulation reference signals (DMRS) associated with a machine-type communication physical downlink control channel (MPDCCH) and used for the MPDCCH, and each of a second set of antenna ports used for cell-specific reference signals (CRS);

receive the CRS on one or more antenna ports of the second set of antenna ports; and receive the MPDCCH using at least the CRS based at least in part on the relationship, wherein:

the relationship:

is determined based at least in part on a radio network temporary identifier or a search space associated with the MPDCCH, indicates a first antenna port, of the first set of antenna ports, or MPDCCH candidate for which a CRS-based channel estimation for the MPDCCH is enabled and a second antenna port or MPDCCH candidate for which the CRS-based channel estimation for the MPDCCH is disabled, or indicates the first antenna port or MPDCCH candidate for a previous precoding matrix indicator value, reported by the UE, for determining the relationship between each of the first set of antenna ports and each of the second set of antenna ports, signaling is used to enable or disable the CRS-based channel estimation for the MPDCCH associated with broadcast information or unicast information, for the radio network temporary identifier, for the search space, for a coverage enhancement level or mode, or a combination thereof, the MPDCCH is associated with the unicast information, and is received using the CRS based at least in part on a capability report indicating that the UE supports the CRS-based channel estimation for the MPDCCH, or a power boost value associated with the first antenna port is signaled with respect to a third antenna port of the second set of antenna ports.

24. The UE of claim 23, wherein the one or more processors, to receive the MPDCCH, are configured to demodulate the MPDCCH based at least in part on the CRS-based channel estimation.

25. The UE of claim 23, wherein the relationship indicates that the first antenna port and the third antenna port are the same.

26. The UE of claim 23, wherein the relationship indicates a precoding relationship between at least one first antenna port, of the first set of antenna ports, and at least one second antenna port of the second set of antenna ports.

27. The UE of claim 26, wherein the precoding relationship indicates a manner in which channel estimates from the third antenna port are to be combined to estimate a channel for the first antenna port.

28. The UE of claim 23, wherein the relationship is determined based at least in part on a number of antenna ports included in the second set of antenna ports.

29. The UE of claim 23, wherein the relationship is predefined or hard-coded in memory of the UE, is indicated to the UE by a base station, is indicated to the UE in a radio resource control (RRC) message, is indicated to the UE in a system information block (SIB) message, or a combination thereof.

30. The UE of claim 23, wherein the relationship varies over at least one of time or frequency.

31. The UE of claim 23, wherein the relationship is determined for a physical resource block.

32. The UE of claim 23, wherein the relationship is determined and the MPDCCH is received using the CRS based at least in part on a determination that the CRS-based channel estimation for the MPDCCH is enabled.

33. The UE of claim 32, wherein the determination is based at least in part on an indication included in a system information block.

34. The UE of claim 23, wherein the MPDCCH is associated with the unicast information, and wherein the MPDCCH is received using the CRS based at least in part on a capability report indicating that the UE supports the CRS-based channel estimation for the MPDCCH.

35. The UE of claim 23, wherein the relationship is determined based at least in part on the radio network temporary identifier or the search space.

36. The UE of claim 23, wherein the relationship indicates the first antenna port or MPDCCH candidate for which the previous precoding matrix indicator value is to be used for determining the relationship between each of the first set of antenna ports and each of the second set of antenna ports.

37. The UE of claim 23, wherein the power boost value is signaled with respect to the third antenna port.

38. A non-transitory computer-readable medium storing one or more instructions for wireless communication, the one or more instructions comprising:
    one or more instructions that, when executed by one or more processors of a user equipment (UE), cause the one or more processors to:
        determine a relationship between each of a first set of antenna ports, used for demodulation reference signals (DMRS) associated with a machine-type communication physical downlink control channel (MPDCCH) and used for the MPDCCH, and each of a second set of antenna ports used for cell-specific reference signals (CRS);
        receive the CRS on one or more antenna ports of the second set of antenna ports; and
        receive the MPDCCH using at least the CRS based at least in part on the relationship,
        wherein:
            the relationship:
                is determined based at least in part on a radio network temporary identifier or a search space associated with the MPDCCH,
                indicates a first antenna port, of the first set of antenna ports, or MPDCCH candidate for which a CRS-based channel estimation for the MPDCCH is enabled and a second antenna port or MPDCCH candidate for which the CRS-based channel estimation for the MPDCCH is disabled, or
                indicates the first antenna port or MPDCCH candidate for a previous precoding matrix indicator value, reported by the UE, for determining the relationship between each of the first set of antenna ports and each of the second set of antenna ports,
            signaling is used to enable or disable the CRS-based channel estimation for the MPDCCH associated with broadcast information or unicast information, for the radio network temporary identifier, for the search space, for a coverage enhancement level or mode, or a combination thereof,
            the MPDCCH is associated with the unicast information, and is received using the CRS based at least in part on a capability report indicating that the UE supports the CRS-based channel estimation for the MPDCCH, or
            a power boost value associated with the first antenna port is signaled with respect to a third antenna port of the second set of antenna ports.

39. The non-transitory computer-readable medium of claim 38, wherein the one or more instructions, that cause the one or more processors to receive the MPDCCH, further cause the one or more processors to demodulate the MPDCCH based at least in part on the CRS-based channel estimation.

40. The non-transitory computer-readable medium of claim 38, wherein the relationship indicates at least one of:
    the first antenna port and the third antenna port being the same;
    a precoding relationship between at least one first antenna port, of the first set of antenna ports, and at least one second antenna port of the second set of antenna ports;
    a manner in which channel estimates from the third antenna port are to be combined to estimate a channel for the first antenna port; or
    a combination thereof.

41. The non-transitory computer-readable medium of claim 38, wherein the relationship is determined based at least in part on a number of antenna ports included in the second set of antenna ports.

42. The non-transitory computer-readable medium of claim 38, wherein the relationship is predefined or hard-coded in memory of the UE, is indicated to the UE by a base station, is indicated to the UE in a radio resource control (RRC) message, is indicated to the UE in a system information block (SIB) message, or a combination thereof.

43. The non-transitory computer-readable medium of claim 38, wherein the relationship varies over at least one of time or frequency, is determined for a physical resource block, or a combination thereof.

44. The non-transitory computer-readable medium of claim 38, wherein the relationship is determined and the MPDCCH is received using the CRS based at least in part on a determination that the CRS-based channel estimation for the MPDCCH is enabled.

45. The non-transitory computer-readable medium of claim 44, wherein the determination is based at least in part on an indication included in a system information block.

46. The non-transitory computer-readable medium of claim 38, wherein the MPDCCH is associated with the unicast information, and wherein the MPDCCH is received using the CRS based at least in part on a capability report indicating that the UE supports the CRS-based channel estimation for the MPDCCH.

47. The non-transitory computer-readable medium of claim 38, wherein the relationship indicates at least one antenna port or MPDCCH candidate for which the previous precoding matrix indicator value is to be used for determining the relationship between each of the first set of antenna ports and each of the second set of antenna ports.

48. The non-transitory computer-readable medium of claim 38, wherein the power boost value is signaled with respect to the third antenna port.

49. An apparatus for wireless communication, comprising:
    means for determining a relationship between each of a first set of antenna ports, used for demodulation reference signals (DMRS) associated with a machine-type communication physical downlink control channel (MPDCCH) and used for the MPDCCH, and each of a second set of antenna ports used for cell-specific reference signals (CRS);

means for receiving the CRS on one or more antenna ports of the second set of antenna ports; and means for receiving the MPDCCH using at least the CRS based at least in part on the relationship, wherein:

the relationship:

is determined based at least in part on a radio network temporary identifier or a search space associated with the MPDCCH, indicates a first antenna port, of the first set of antenna ports, or MPDCCH candidate for which a CRS-based channel estimation for the MPDCCH is enabled and a second antenna port or MPDCCH candidate for which the CRS-based channel estimation for the MPDCCH is disabled, or indicates the first antenna port or MPDCCH candidate for a previous precoding matrix indicator value, reported by the apparatus, for determining the relationship between each of the first set of antenna ports and each of the second set of antenna ports, signaling is used to enable or disable the CRS-based channel estimation for the MPDCCH associated with broadcast information or unicast information, for the radio network temporary identifier, for the search space for a coverage enhancement level or mode, or a combination thereof, the MPDCCH is associated with the unicast information, and is received using the CRS based at least in part on a capability report indicating that the apparatus supports the CRS-based channel estimation for the MPDCCH, or a power boost value associated with the first antenna port is signaled with respect to a third antenna port of the second set of antenna ports.

50. The apparatus of claim 49, wherein the means for receiving the MPDCCH comprises means for demodulating the MPDCCH based at least in part on the CRS-based channel estimation obtained.

51. The apparatus of claim 49, wherein the relationship indicates at least one of:

the first antenna port and the third antenna port are the same;

a precoding relationship between at least one first antenna port, of the first set of antenna ports, and at least one second antenna port of the second set of antenna ports;

a manner in which channel estimates from the third antenna port are to be combined to estimate a channel for the first antenna port; or a combination thereof.

52. The apparatus of claim 49, wherein the relationship is determined based at least in part on a number of antenna ports included in the second set of antenna ports.

53. The apparatus of claim 49, wherein the relationship is predefined or hard-coded in memory of the apparatus, is indicated to the apparatus by a base station, is indicated to the apparatus in a radio resource control (RRC) message, is indicated to the apparatus in a system information block (SIB) message, or a combination thereof.

54. The apparatus of claim 49, wherein the relationship varies over at least one of time or frequency, is determined for a physical resource block, or a combination thereof.

55. The apparatus of claim 49, wherein the relationship is determined and the MPDCCH is received using the CRS based at least in part on a determination that the CRS-based channel estimation for the MPDCCH is enabled.

56. The apparatus of claim 55, wherein the determination is based at least in part on an indication included in a system information block.

57. The apparatus of claim 49, wherein the MPDCCH is associated with the unicast information, and wherein the MPDCCH is received using the CRS based at least in part on a capability report indicating that the apparatus supports the CRS-based channel estimation for the MPDCCH.

58. The apparatus of claim 49, wherein the relationship indicates the first antenna port or MPDCCH candidate for which the previous precoding matrix indicator value is to be used for determining the relationship between each of the first set of antenna ports and each of the second set of antenna ports.

59. The apparatus of claim 49, wherein the power boost value is signaled with respect to the third antenna port.

* * * * *